US012355188B2

(12) United States Patent
Wolter et al.

(10) Patent No.: US 12,355,188 B2
(45) Date of Patent: Jul. 8, 2025

(54) SELF-ALIGNING ELECTRICAL CONNECTOR SYSTEM

(71) Applicant: KOSTAL Kontakt Systeme GmbH, Luedenscheid (DE)

(72) Inventors: Martin Wolter, Dortmund (DE); Erik Rolf, Wermelskirchen (DE); Benedikt Specht, Sundern (DE); Guido Eberhardt, Hagen (DE); Stefan Amelung, Dortmund (DE)

(73) Assignee: KOSTAL Kontakt Systeme Gmbh & Co. KG, Luedenscheid (DE)

( * ) Notice: Subject to any disclaimer, the term of this patent is extended or adjusted under 35 U.S.C. 154(b) by 433 days.

(21) Appl. No.: 17/980,289

(22) Filed: Nov. 3, 2022

(65) Prior Publication Data

US 2023/0056007 A1 Feb. 23, 2023

Related U.S. Application Data

(63) Continuation of application No. PCT/EP2021/068375, filed on Jul. 2, 2021.

(30) Foreign Application Priority Data

Jul. 11, 2020 (DE) ..................... 10 2020 004 182.5

(51) Int. Cl.
*H01R 13/629* (2006.01)
*H01R 13/20* (2006.01)

(52) U.S. Cl.
CPC ........... *H01R 13/629* (2013.01); *H01R 13/20* (2013.01)

(58) Field of Classification Search
CPC ........................... H01R 13/629; H01R 13/631; H01R 13/6315; H01R 13/639; H01R 13/20; H01R 13/207; H01R 13/213
(Continued)

(56) References Cited

U.S. PATENT DOCUMENTS 4,661,037 A 4/1987 Sugino et al.
4,954,005 A 9/1990 Knasel et al.
(Continued)

FOREIGN PATENT DOCUMENTS

CN 106099537 A 11/2016
DE 102019205548 A1 6/2020
(Continued)

OTHER PUBLICATIONS

The International Bureau of WIPO, International Preliminary Report on Patentability for International Application No. PCT/EP2021/068375 issued Jan. 17, 2023.
(Continued)

*Primary Examiner* — Abdullah A Riyami
*Assistant Examiner* — Amara Anderson
(74) *Attorney, Agent, or Firm* — Brooks Kushman P.C.

(57) ABSTRACT

A self-aligning electrical connector system for data and/or energy transmission includes first and second connector parts and a support frame. The first connector part includes positioning pins, flat elements, and a ball socket positioned between the flat elements. The second connector part is attachable to the first connector part and includes positioning chambers engageable with the positioning pins to achieve a coarse positioning of the connector parts relative to one another. The support frame has a flat central bar including spring arms. A ball is supported by the ball socket. The first connector part is supported on the support frame by spring forces of the spring arms acting on the flat elements and is supported on the ball with the ball being rollable on the central bar whereby the first connector part is floatingly arranged on the support frame and is shiftable and tiltable relative to the support frame.

12 Claims, 5 Drawing Sheets

(58) Field of Classification Search
USPC .......................................................... 439/157
See application file for complete search history.

(56) References Cited

U.S. PATENT DOCUMENTS

| | | | | | |
|---|---|---|---|---|---|
| 6,007,375 | A * | 12/1999 | Mackowiak | H01R 13/743 | 439/571 |
| 6,159,030 | A * | 12/2000 | Gawron | H01R 13/6315 | 439/247 |
| 10,958,014 | B1 * | 3/2021 | Martin | H01R 13/6215 | |
| 2006/0199415 | A1 * | 9/2006 | Noguchi | H01R 13/6315 | 439/350 |
| 2008/0026622 | A1 * | 1/2008 | Tomizu | H01R 13/6315 | 439/247 |
| 2014/0370720 | A1 * | 12/2014 | Lange | B60R 16/023 | 439/246 |

FOREIGN PATENT DOCUMENTS

| | | | |
|---|---|---|---|
| EP | 1701413 | A1 | 9/2006 |
| EP | 2816674 | A1 | 12/2014 |

OTHER PUBLICATIONS

European Patent Office, International Search Report for corresponding International Application No. PCT/EP2021/068375, issued Oct. 12, 2021.

German Patent and Trademark Office, German Search Report for corresponding German Patent Application No. DE 10 2020 004 182.5, dated Mar. 1, 2021.

* cited by examiner

SELF-ALIGNING ELECTRICAL CONNECTOR SYSTEM

CROSS-REFERENCE TO RELATED APPLICATIONS

This application is a continuation of International Application No. PCT/EP2021/068375, published in German, with an international filing date of Jul. 2, 2021, which claims priority to DE 10 2020 004 182.5, filed Jul. 11, 2020, the disclosures of which are incorporated in their entirety by reference herein.

TECHNICAL FIELD

The present invention relates to a self-aligning electrical connector system for data and/or energy transmission, the connector system including a first connector part having low-load contact and/or high-load contact elements, a second connector part attachable to the first connector part and having low-load contact elements and/or high-load contact elements that are complementary to the low-load contact elements and/or high-load contact elements of the first connector part, the first connector part having positioning pins engageable in positioning chambers of the second connector part in order to achieve rough positioning of the first and second connector parts relative to one another, and a flat support frame at which the first connector part is situated in a floating manner with three rotational and at least two translational degrees of freedom.

BACKGROUND

Such a connector system is suited, for example, for establishing electrical connections for a vehicle battery of an electrically driven motor vehicle. In this case, relatively high currents, also with relatively high voltages, are conducted via high-load contact elements having fairly large cross sections. In addition, multiple electrical connections are usually necessary for data and control signals, which may be conducted via low-load contact elements having much smaller cross sections.

For this purpose, an electrical connector system is provided that includes first and second connector parts, which as plug connectors having a complex design may be connected to one another. Mutually complementary high-load and low-load contact elements, which are brought into contact with one another by the connector parts being joined together, are situated at the first and second connector parts.

The joining of multi-pole plug connectors having a complex design requires considerable care in assembling the connector parts, in particular when the plug connectors include contact elements having different dimensions. It is particularly problematic that connecting the high-load contact elements requires a certain amount of force. If tilting of the two connector parts occurs, then there is a risk of the much smaller and mechanically more sensitive low-load contact elements being damaged.

To avoid such damage, it is necessary for the first and second connector parts, with their complementary mating plug connectors, to be joined linearly in the intended insertion direction (i.e., in a straight line in the intended insertion direction). To achieve this in an optimal manner, so-called self-aligning electrical connectors are used.

A generic self-aligning electrical connector is known from EP 2 816 674 A1 (corresponds to U.S. Pat. No. 9,306,331). For alignment with a mating connector, the described connector includes a mounting means for fastening a base plate to a structure, and an arrangement that connects the base plate to the mounting means and that includes frames slidably connected to one another. The design of this connector is thus relatively costly and complex.

SUMMARY

An object of the present invention is to provide a self-aligning electrical connector whose mechanism for self-alignment has a particularly simple design and is cost-effectively manufacturable.

In embodiments, a self-aligning electrical connector system for data and/or energy transmission includes a first connector part, a second connector part, and a level support frame. The second connector part is joinable to the first connector part. The first connector part includes multiple low-load contact elements and/or high-load contact elements. The second connector part includes multiple low-load contact elements and/or high-load contact elements that are complementary to the low-load contact elements and/or high-load contact elements of the first connector part. The first connector part further includes multiple positioning pins, and the second connector part further includes multiple positioning chambers. The positioning pins of the first connector part are engageable in the positioning chambers of the second connector part in order to achieve a rough positioning of the first and second connector parts relative to one another. The first connector part is floatingly arranged on the level support frame with three rotational and at least two translational degrees of freedom.

The first connector part further includes multiple flat elements on its underside which protrude laterally in opposing directions. The flat elements of the first connector part are loaded with a spring force by spring arms formed on the support frame in the direction of the support frame. The first connector part further includes a ball cup between the flat elements. The ball cup supports a ball that is in contact with the support frame.

Embodiments of the present invention achieve the above object and/or other objects in that the first connector part on its bottom or underside includes multiple flat elements that protrude laterally in opposite directions, and that are subjected to load by an elastic force in the direction of the support frame by spring arms that are formed on the support frame, and in that the first connector part includes a ball socket between the flat elements, the ball socket supports a ball that rests against the support frame.

Thus, the first connector part is not connected to the support frame in a form-fit manner (i.e., the first connector part is not positively connected to the support frame). Instead, the first connector part is supported on the support frame by the elastic forces (spring forces) of multiple spring arms which act on the laterally protruding flat elements of the first connector part. Between the flat elements, the first connector part is supported (mounted) on a ball that is held on the first connector part by a ball socket and that can roll on a flat bar on the support frame.

The ball is centrally situated between the spring arms, so that the basically unstable position of the first connector part is balanced by the elastic forces acting on the flat elements.

The spring arms resting on the flat elements allow lateral movements of the flat elements so that the first connector part can make movements parallel to the plane of the support frame. This allows translational movements of the first connector part relative to the support frame in two mutually perpendicular directions, and also allows rotation about the vertical axis of the first connector part. The spring arms elastically (resiliently) resting on the flat elements may also individually deflect in the vertical direction, thus allowing, to a certain extent, tilting about two further body axes of the first connector part.

The first connector part thus has two translational and three rotational degrees of freedom, via which the first connector part may align with the second connector part when the second connector part is attached to the first connector part.

This allows simplification of the insertion operation and largely prevents damage to the contact elements. In particular, this even allows safe "blind" joining of the plug connector parts and assists with the joining by a robot.

The mechanism, having a relatively simple and thus cost-effective design, that movably arranges the first connector part at the support frame is particularly advantageous.

BRIEF DESCRIPTION OF THE DRAWINGS

One exemplary embodiment of a self-aligning electrical connector system in accordance with the present invention is illustrated with reference to the drawings and explained in greater detail below, in which the drawings include the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1, 2, 3, 4, and 5, a self-aligning electrical connector system in accordance with an embodiment of the present invention will be described. The connector system is suited, for example, for establishing electrical connections for a vehicle battery of an electrically driven motor vehicle.

Figure 1:
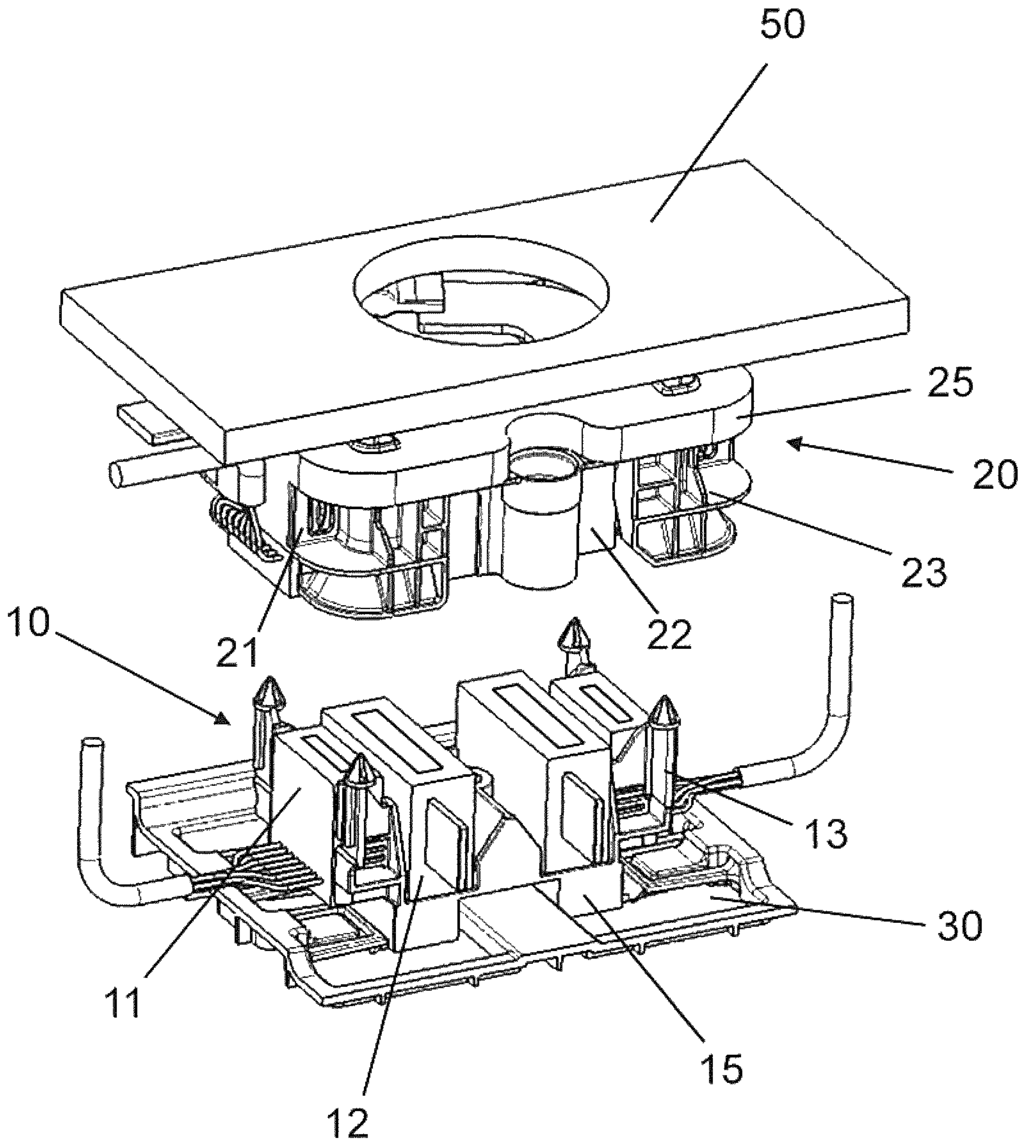
FIG. 1 illustrates a self-aligning electrical connector system, the connector system having a first connector part, a second connector part, and a support frame.

As shown in FIG. 1, the connector system includes a first connector part 10, a second connector part 20, and a flat support frame (planar carrier frame) 30. First connector part 10 is provided as a stationary connector part. For the stated application, first connector part 10 may be installed in a motor vehicle. For this purpose, support frame 30 is fixedly connected to the body of the vehicle. Second connector part 20, illustrated in FIG. 1 beneath a cover 50, is connected to a charging cable (not shown) that is in electrical connection with a charging device situated outside the vehicle.

Multiple electrical contact elements 11, 12, 21, 22, which at the two connector parts 10, 20 in each case have a complementary design with one another as plugs and push-on sleeves, and which may be electrically as well as mechanically connected to one another by joining the two connector parts 10, 20, are situated at the first and at the second connector part 10, 20 at a first and at a second contact carrier 15, 25, respectively. In the drawings, electrical contact elements 11, 12, 21, 22 are illustrated in a simplified manner only by a housing in each case. An illustration of metal plugs and push-on sleeves inside this housing has been omitted.

In addition to single-pole high-load contact elements 12, 22 for energy transmission from the charging device to the vehicle, the connector system at each connector part 10, 20 includes, for example, two multipole low-load connectors 11, 21, respectively. Low-load connectors 11, 21 are suitable, for example, for transferring control signals or data between the vehicle and the charging device.

Attaching second connector part 20 to first connector part 10 by hand or via robot requires a certain precision, in particular in order to not damage the smaller and thus more mechanically sensitive low-load contact elements 11, 21 during the insertion operation. However, it is difficult to achieve an exact alignment during the attachment process due to the size and the complex design of connector parts 10, 20. Consequently, as a rule, slight shifting and/or tilting of the two connector parts 10, 20 relative to one another upon their mutual approach is practically unavoidable.

To still allow a smooth connection and to prevent damage to contact elements 11, 12, 21, 22 due to non-coaxial joining, first connector part 10 is floatingly arranged on support frame 30, so that first connector part 10 may shift and tilt relative to support frame 30 and thus be able to align with second connector part 20 during the attachment operation.

Figure 2:
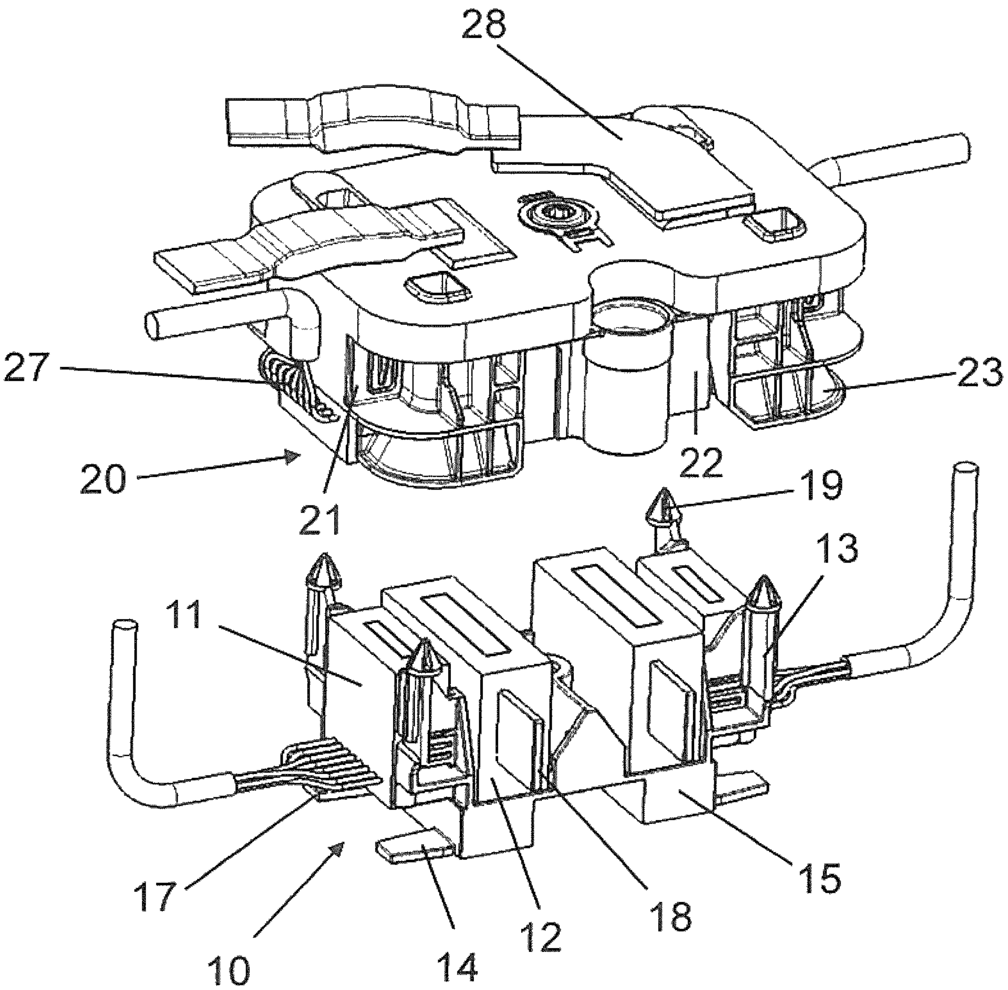
FIG. 2 illustrates the first connector part and the second connector part.

FIG. 2 shows first and second connector parts 10, 20 as individual parts. Electrical feed lines 17, 27 are provided for low-load contact elements 11, 21 at the two connector parts 10, 20. Terminals 18 and feed lines 28, having a small cross section, are provided for high-load contact elements 12, 22 at the two connector parts 10, 20.

Contact carrier 15 of first connector part 10 includes two pairs of laterally protruding flat elements (flat projections) 14. The two flat elements 14 in each pair of flat elements 14 extend in opposite directions. In this embodiment, contact carrier 15 includes four flat elements 14 in total. Two flat elements 14 are illustrated in FIG. 2. Parallel to the illustrated flat elements, first connector part 10 includes two further flat elements, which, however, are concealed in FIG. 2 by low-load contact elements 11.

First connector part 10 further includes multiple positioning pins 13. Second connector parts 20 further includes multiple positioning chambers 23. Positioning pins 13 of first connector part 10 are engageable in positioning chambers 23 of second connector part 20 when the two connector parts 10, 20 are joined, in order to achieve rough (coarse) positioning of the two connector parts 10, 20 relative to one another.

Positioning pins 13 of first connector part 10 preferably have conical end sections 19. Positioning chambers 23 of second connector part 20 are preferably designed in each case as a conical cavity. Positioning pins 13 engage with positioning chambers 23 by end sections 19 of the positioning pins being inserted into the conical cavities of the positioning chambers. The conical shapes simplify inserting positioning pins 13 into positioning chambers 23, and together with a floating bearing of first connector part 10 on support frame 30 (described in further detail below), result in a simple pre-centering of the two connector parts 10, 20 relative to one another.

Figure 3:
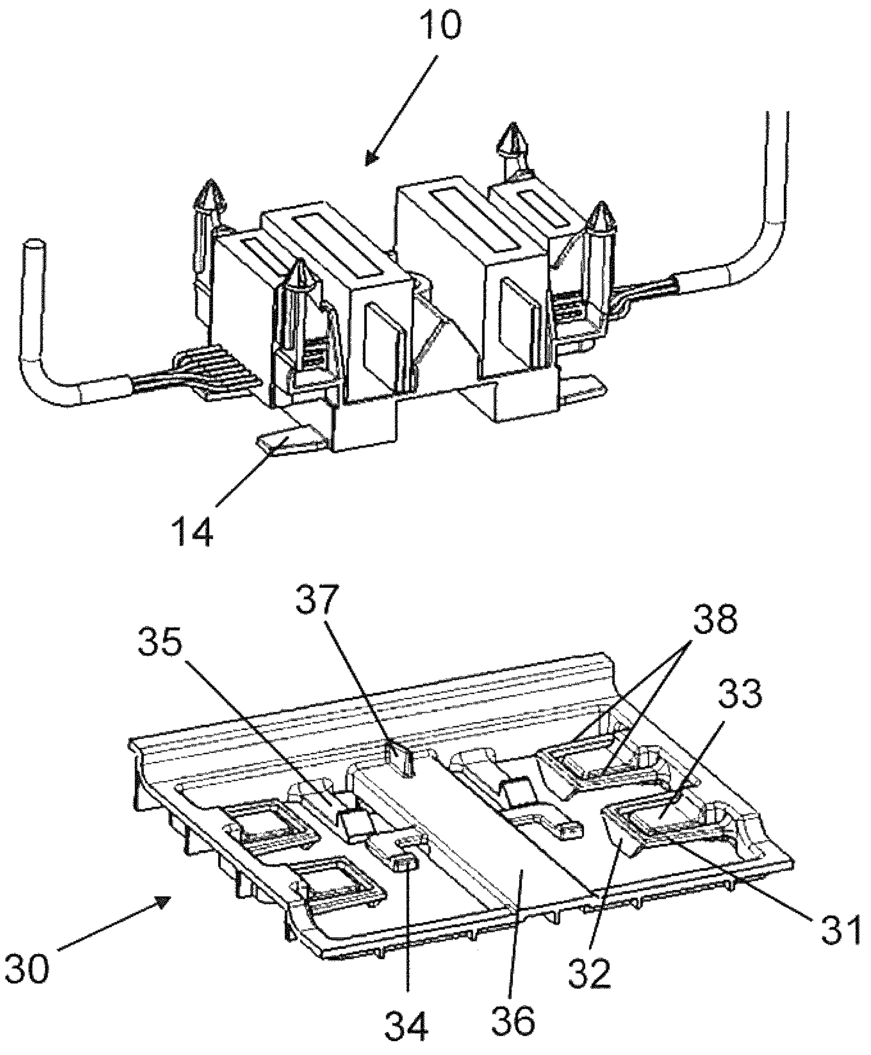
FIG. 3 illustrates the first connector part and the support frame.

Prior to first and second connector parts 10, 20 being joined together, first connector part 10 is connected to support frame 30 in a floating manner. As shown in FIG. 3, support frame 30 has a central bar 36 extending in the transverse direction, on which two laterally lying support arms 34, bent at a right angle, are formed on the sides. Support arms 34 function to support first connector part 10 elastically or resiliently. Support frame 30 at its rear longitudinal side has two molded-on (integrally formed) latching hooks (detent hooks) 35.

Situated at each of the two narrow sides of support frame 30 are two elastic spring arms 31. Spring arms 31 are each formed from two pin-like bars 38, whose end faces are connected via a flat section referred to as a retaining tab 32. The relatively thin pin-like bars 38 are connected in one piece to the narrow sides of support frame 30.

Delimiting braces (boundary struts) 33 are formed on support frame 30 in each case between the two pin-like bars 38 of each spring arm 31. Delimiting braces 33, due to their more massive design, are relatively rigidly connected to support frame 30.

Figure 4:
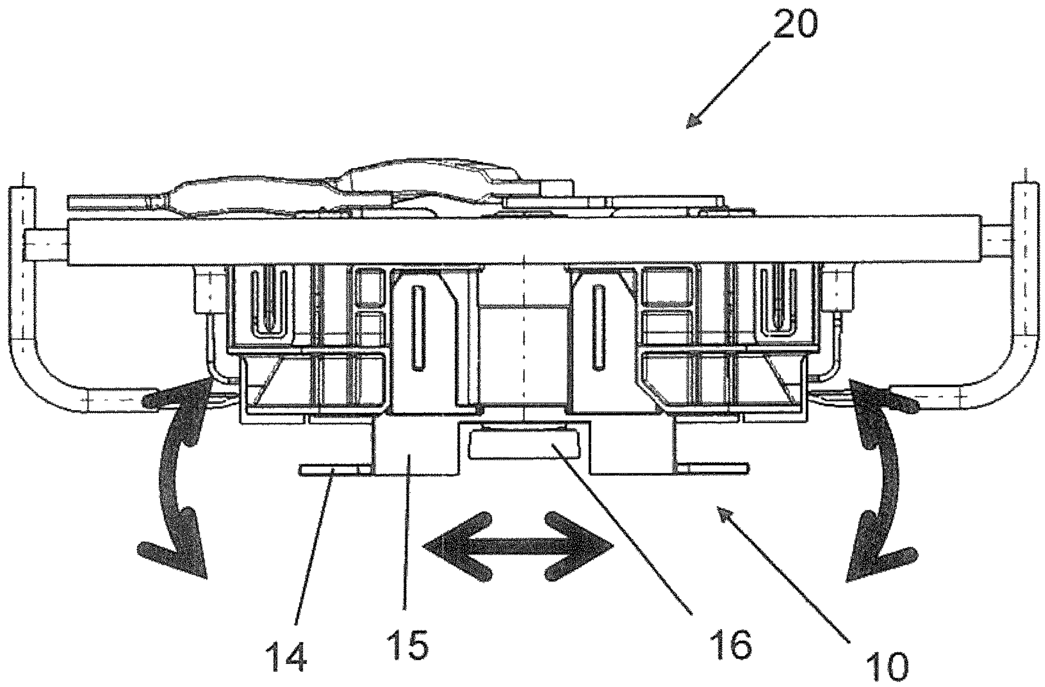
FIG. 4 illustrates possible movements of the connector system.

As shown in FIG. 4, a molding designed as a ball socket 16 that is open toward the bottom side is situated at first connector part 10 and between flat elements 14. That is, on first connector part 10 there is a formed part which is formed as ball socket 16 opening towards the bottom side of the first connector part. Ball socket 16 rests against support frame 30 while first connector part 10 is floatingly arranged on support frame 30.

For connecting first connector part 10 to support frame 30, a ball 40 is inserted into ball socket 16 and is also mounted on central bar 36 (FIG. 3) of support frame 30. Thereafter, flat elements 14 of first connector part 10 are each pushed beneath delimiting braces 33 and beneath elastic retaining tabs 32 until detent hooks 35 loosely engage with detent receptacles (not shown) on first connector part 10. The sole function of detent hooks 35 is to secure first connector part 10 from falling out along the transverse direction of support frame 30; in addition, detent hooks 35 do not limit lateral relative movements between first connector part 10 and support frame 30.

A floating bearing (floating mounting) of first connector part 10 on support frame 30 is now achieved in that flat elements 14, formed on the bottom side of first connector part 10, are loaded with an elastic or spring force by spring arms 31 that are integrally molded onto support frame 30 in the direction of support frame 30, and in that first connector part 10, also carried on ball 40, is supported on support frame 30.

Flat elements 14 are thus situated beneath the elastic retaining tabs 32. Elastic retaining tabs 32 with their elastic or spring force hold down flat elements 14 in the direction of the base surface 39 and balance them out due to the bearing on ball 40. This is explained by the schematic illustration in FIG. 5.

The centrally situated ball 40 supports first connector part 10, situated on a vehicle as an example, in the attachment direction of second connector part 20 to support frame 30, and allows tilting and shifting movements of first connector part 10 about the support or contact point of ball 40 on support frame 30. Flat elements 14 situated around ball 40 at first connector part 10 are pressed in the direction of the support frame surface by spring arms 31 that are formed on support frame 30. Spring arms 31 thus fix first connector part 10 to support frame 30 in a floating manner, while allowing rotational and displacement movement.

Figure 5:
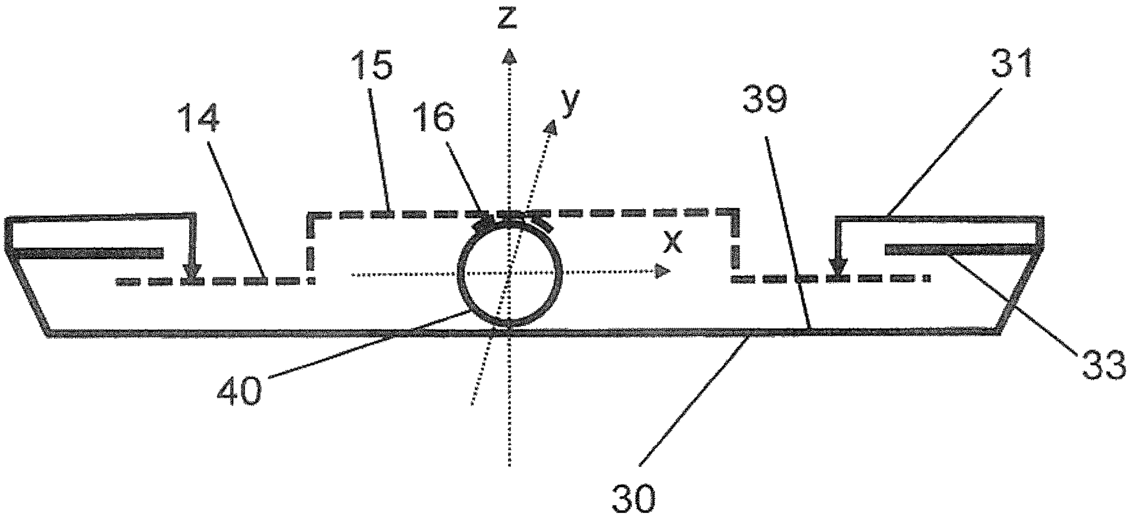
FIG. 5 illustrates schematically the mounting of the first connector part on the support frame.

FIG. 4 indicates via arrows only a few possibilities for shifting and tilting first connector part 10 relative to support frame 30. For a more accurate description of the movement options, an orthogonal coordinate system having the coordinate axes x, y, and z is illustrated in FIG. 5. The origin of the coordinate system has been arbitrarily placed at the midpoint of ball 40. The x coordinate axis x extends parallel to base surface 39 of support frame 30 in the plane of the drawing. The z coordinate axis, as the vertical axis, is likewise situated in the plane of the drawing. The y coordinate axis (not completely illustrated in the drawing) is oriented perpendicularly with respect to the plane of the drawing.

The bearing of first connector part 10 on ball 40 and spring arms 31 of support frame 30 allows translational movements of first connector part 10 in the x and y directions, tilting movements about the x and y axes, and rotational movements about the z axis. The amplitude of the tilting movements is limited by delimiting braces 33, which act as stops. To limit the amplitude of rotational movements about the z axis, a vertically protruding stop element 37 may be formed on central bar 36 of support frame 30 (FIG. 3). The amplitude of translational movements of first connector part 10 in the x and y directions is limited to the required extent by the shape of support frame 30.

Figure 6:
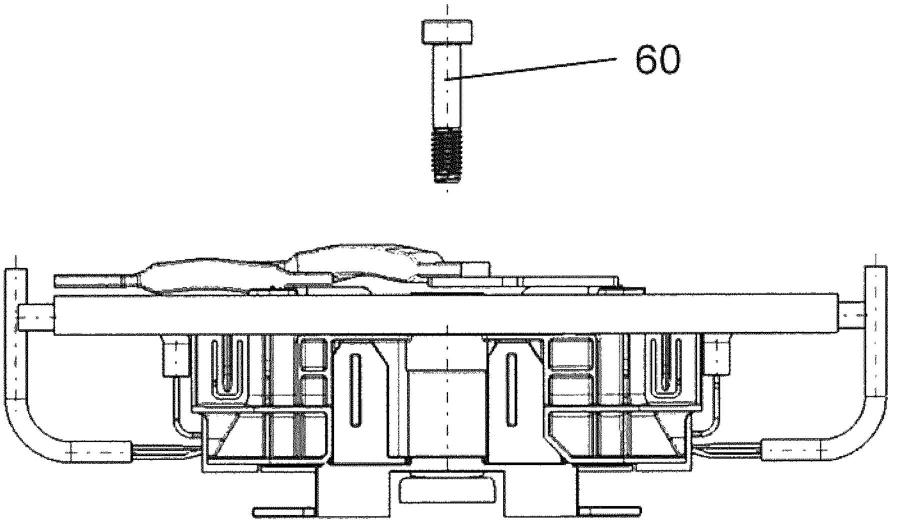
FIG. 6 illustrates the fixing of the first and second connector parts to one another.
Figure 7:
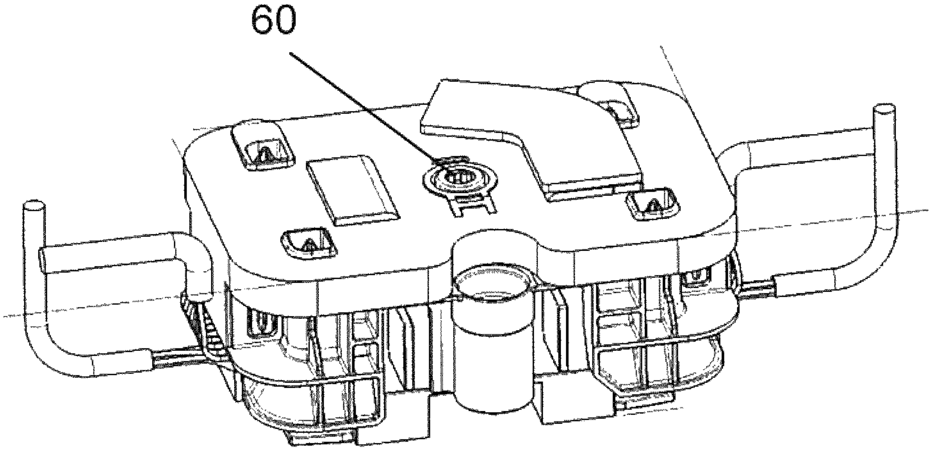
FIG. 7 illustrates the first and second connector parts fixed to one another.

Due to the comprehensive movement options between first and second connector parts 10, 20 and the centering by positioning pins 13 that engage in positioning chambers 23, initial misalignments between the two connector parts 10, 20 are quickly compensated for, thus ensuring easy joining of the contact elements 11, 12, 21, 22 of the two connector parts 10, 20. After the joining operation is completed, the connection of the two connector parts 10, 20 may be easily secured using a single, centrally inserted screw 60 (FIGS. 6 and 7).

LIST OF REFERENCE SYMBOLS

- 10 first connector part
- 11 low-load contact elements
- 12 high-load contact elements
- 13 positioning pins
- 14 flat elements (flat projections)
- 15 contact carrier
- 16 ball socket (ball cup)
- 17 feed lines
- 18 terminals
- 19 cone-shaped end sections (tapered end portions)
- 20 second connector part
- 21 low-load contact elements
- 22 high-load contact elements
- 23 positioning chambers
- 25 contact carrier
- 27 feed lines
- 28 feed lines
- 30 support frame (carrier frame)
- 31 spring arms
- 32 retaining tab
- 33 delimiting braces (boundary or limiting struts)
- 34 support arms
- 35 latching hook (detent hook)
- 36 central bar
- 37 stop element

38 pin-shaped bars
39 base surface
40 ball
50 cover
60 screw
x, y, z coordinate axes While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A self-aligning electrical connector system for data and/or energy transmission, the connector system comprising:
a first connector part including first low-load contact elements and/or first high -load contact elements;
a second connector part attachable to the first connector part and including second low-load contact elements and/or second high-load contact elements that are complementary to the first low-load contact elements and/or the first high-load contact elements;
the first connector part further including positioning pins and the second connector part further including positioning chambers, the positioning pins being engageable in the positioning chambers to achieve rough positioning of the first and second connector parts relative to one another;
a flat support frame having spring arms formed thereon;
the first connector part being floatingly arranged on the support frame with three rotational and at least two translational degrees of freedom;
wherein the first connector part includes flat elements that protrude laterally in opposite directions and that are loaded with a spring force by the spring arms in a direction of the support frame; and
the first connector part further includes a ball socket positioned between the flat elements, the ball socket supporting a ball which rests against the support frame.

2. The connector system of claim 1 wherein:
the positioning pins have cone-shaped end sections.

3. The connector system of claim 1 wherein:
the positioning chambers have cone-shaped cavities.

4. The connector system of claim 1 wherein:
the support frame further includes boundary struts associated with the spring arms for limiting tilting movement of the first connector part while the flat elements of the first connector part are subjected to the load by the elastic force in the direction of the support frame by the spring arms of the support frame.

5. The connector system of claim 1 wherein:
an attachment of the second connector part to the first connector part is fixed via a screw.

6. The connector system of claim 1 wherein:
the first connector part includes the first low-load contact elements and the first high-load contact elements; and
the second connector part includes the second low-load contact elements and the second high-load contact elements.

7. A self-aligning electrical connector system for data and/or energy transmission, the connector system comprising:
a first connector part including positioning pins, flat elements that protrude in opposite directions, and a ball socket positioned between the flat elements;
a second connector part attachable to the first connector part and including positioning chambers engageable with the positioning pins to achieve a coarse positioning of the first and second connector parts relative to one another;
a support frame having a flat central bar including spring arms;
a ball supported by the ball socket; and
the first connector part being supported on the support frame by spring forces of the spring arms acting on the flat elements and being supported on the ball with the ball being rollable on the central bar whereby the first connector part is floatingly arranged on the support frame and is shiftable and tiltable relative to the support frame.

8. The connector system of claim 7 wherein:
the first connector part further includes first contact elements; and
the second connector part further includes second contact elements that are complementary to the first contact elements.

9. The connector system of claim 7 wherein:
the first connector part further includes first low-load contact elements and/or first high-load contact elements; and
the second connector part further includes second low-load contact elements and/or second high-load contact elements that are complementary to the first low-load contact elements and/or the first high-load contact elements.

10. The connector system of claim 7 wherein:
each spring arm includes two pin-like bars and a retaining tab which connects end faces of the pin-like bars together.

11. The connector system of claim 10 wherein:
the flat elements are pushed beneath the retaining tabs which function to hold down the flat elements for the first connector part being supported on the support frame by spring forces of the spring arms acting on the flat elements.

12. The connector system of claim 10 wherein:
the support frame further includes a boundary strut between the two pin-like bars of each spring arm.

* * * * *